United States Patent
Kohori et al.

(10) Patent No.: US 11,107,603 B2
(45) Date of Patent: Aug. 31, 2021

(54) MULTI-CORE FLAT CABLE FOR VEHICLE

(71) Applicant: SUMITOMO ELECTRIC INDUSTRIES, LTD., Osaka (JP)

(72) Inventors: Takaya Kohori, Kanuma (JP); Hiroyuki Okawa, Kanuma (JP)

(73) Assignee: Sumitomo Electric Industries, LTD., Osaka (JP)

(*) Notice: Subject to any disclaimer, the term of this patent is extended or adjusted under 35 U.S.C. 154(b) by 206 days.

(21) Appl. No.: 15/748,849

(22) PCT Filed: Jun. 2, 2017

(86) PCT No.: PCT/JP2017/020710
§ 371 (c)(1),
(2) Date: Jan. 30, 2018

(87) PCT Pub. No.: WO2017/209298
PCT Pub. Date: Dec. 7, 2017

(65) Prior Publication Data
US 2020/0168359 A1    May 28, 2020

(30) Foreign Application Priority Data
Jun. 2, 2016   (JP) ............................... JP2016-111154

(51) Int. Cl.
*H01B 7/08*   (2006.01)
*B60R 16/02*  (2006.01)
(Continued)

(52) U.S. Cl.
CPC ....... *H01B 7/0876* (2013.01); *B60R 16/0207* (2013.01); *H01B 7/0869* (2013.01); *H01B 7/1875* (2013.01); *H01B 9/003* (2013.01)

(58) Field of Classification Search
CPC ........ H01B 3/441; H01B 3/445; H01B 3/447; H01B 3/448; H01B 7/295; H01B 7/28; H01B 7/0275; H01B 7/1875; H01B 7/04
(Continued)

(56) References Cited

U.S. PATENT DOCUMENTS 5,342,991 A * 8/1994 Xu .................. H01B 7/0823
                                                174/115
6,630,624 B2 * 10/2003 Tsao ................ H01B 7/0861
                                                174/113 R
(Continued)

FOREIGN PATENT DOCUMENTS

JP    UM-A-S59-181516    12/1984
JP    H06-80217 U        11/1994
(Continued)

OTHER PUBLICATIONS

International Search Report dated Jul. 18, 2017 for PCT/JP2017/020710, including English translation.
(Continued)

*Primary Examiner* — William H. Mayo, III
(74) *Attorney, Agent, or Firm* — Faegre Drinker Bidle & Reath LLP

(57) ABSTRACT

A multi-core flat cable for a vehicle includes a sheath covering two power wires and at least two signal wires. A pair of the signal wires is twisted and is configured as one twisted pair of signal wires. On a section perpendicular to a longitudinal direction, a ratio (long-axis dimension/short-axis dimension) of a long-axis dimension to a short-axis dimension is equal to or greater than 1.8.

13 Claims, 5 Drawing Sheets

(51) Int. Cl.
*H01B 7/18* (2006.01)
*H01B 9/00* (2006.01)

(58) Field of Classification Search
USPC ............... 174/110 R–110 PM, 120 R, 121 R
See application file for complete search history.

(56) References Cited

U.S. PATENT DOCUMENTS

| | | | | |
|---|---|---|---|---|
| 2003/0132022 | A1* | 7/2003 | Williams | H01B 11/1091 174/113 R |
| 2010/0172083 | A1* | 7/2010 | Randall | G06F 1/187 361/679.31 |
| 2011/0008980 | A1* | 1/2011 | Obata | G11B 33/025 439/131 |
| 2011/0088926 | A1* | 4/2011 | Grogl | H01B 9/003 174/107 |
| 2011/0174515 | A1* | 7/2011 | Siahaan | H01B 13/0036 174/107 |
| 2012/0111602 | A1* | 5/2012 | Wei | H01B 7/0861 174/114 R |
| 2012/0292079 | A1 | 11/2012 | Muramatsu et al. | |
| 2013/0277087 | A1* | 10/2013 | Hayakawa | H01B 3/50 174/107 |
| 2015/0000953 | A1* | 1/2015 | Kim | H01B 13/24 174/103 |
| 2015/0129278 | A1* | 5/2015 | Li | H01B 7/0892 174/107 |
| 2016/0284438 | A1* | 9/2016 | Huang | H01B 7/0823 |

FOREIGN PATENT DOCUMENTS

| | | | |
|---|---|---|---|
| JP | 2000-133061 A | 5/2000 | |
| JP | 2006-278207 A | * 10/2006 | ............ H01B 7/17 |
| JP | 2006-278207 A | 10/2006 | |
| JP | 2011-54398 A | 3/2011 | |
| JP | A-2013-041814 | 2/2013 | |
| JP | 2013-237428 A | 11/2013 | |
| JP | 2014-220043 A | 11/2014 | |
| WO | WO-2012/105142 A1 | 8/2012 | |

OTHER PUBLICATIONS

International Search Report/Written Opinion dated Jul. 18, 2017 for PCT/JP2017/020710 [non-English language].

* cited by examiner

MULTI-CORE FLAT CABLE FOR VEHICLE

TECHNICAL FIELD

The present invention relates to a multi-core flat cable for vehicle.

The present application claims priority from Japanese Patent Application No. 2016-111154 filed on Jun. 2, 2016, the entire content of which is incorporated herein by reference.

RELATED ART

Patent Document 1 discloses a cable in which a cable for feeding power to an electric parking brake of a vehicle and a cable for connecting a wheel speed sensor to an ECU are integrated.

CITATION LIST

Patent Documents

Patent Document 1: JP-A-2014-220043

SUMMARY OF THE INVENTION

A multi-core flat cable for vehicle in accordance with an aspect of the disclosure includes:

two power wires each of which includes a first conductor and a first insulating layer covering the first conductor, two signal wires each of which includes a second conductor thinner than the first conductor and a second insulating layer covering the second conductor, and a sheath covering the two power wires and at least the two signal wires, wherein a pair of the signal wires is twisted and is configured as one twisted pair of signal wires, and wherein on a section perpendicular to a longitudinal direction, a ratio (long-axis dimension/short-axis dimension) of a long-axis dimension to a short-axis dimension is equal to or greater than 1.8.

DETAILED DESCRIPTION OF EMBODIMENTS

Problems To Be Solved By Disclosure

Figure 1:
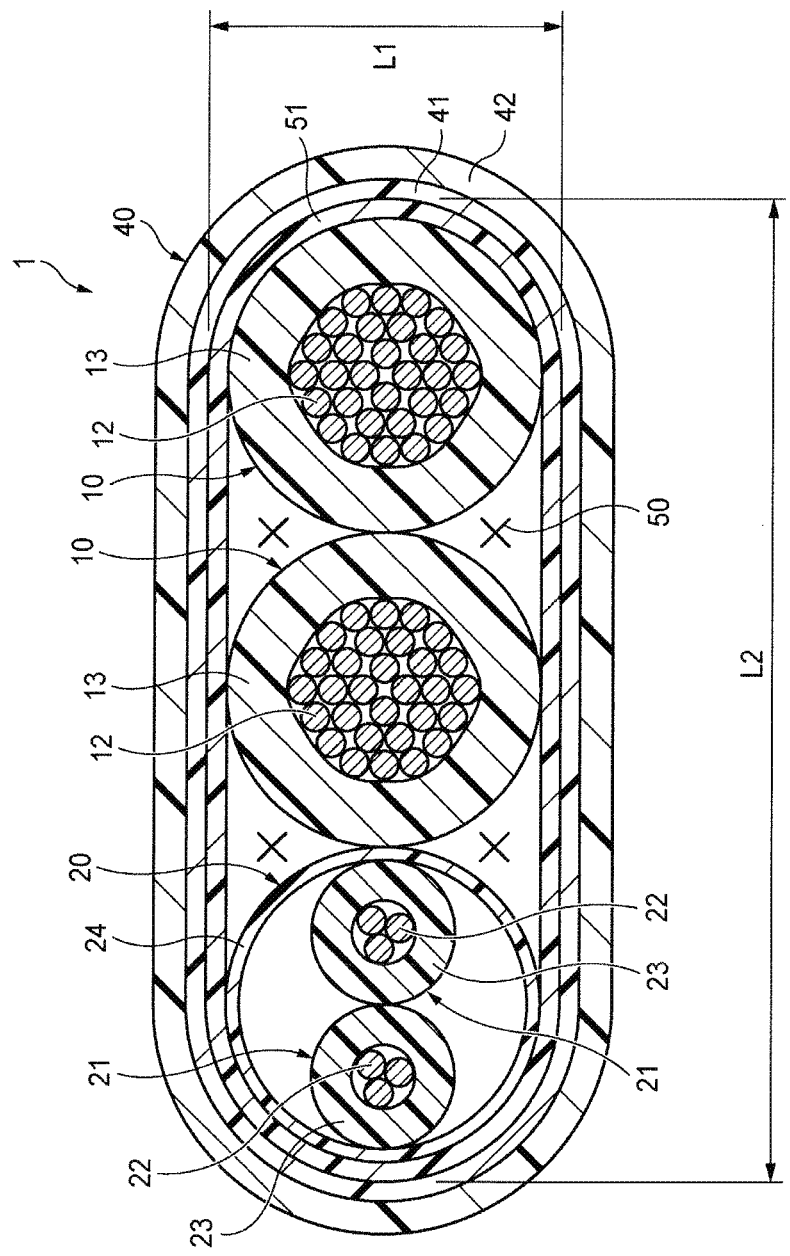
FIG. 1 is a sectional view depicting a multi-core flat cable for vehicle in accordance with a first embodiment of the present invention.

The disclosure is to provide a multi-core flat cable capable of being easily secured to a vehicle.

Effects of Disclosure

According to the disclosure, a multi-core flat cable capable of being easily secured to a vehicle is provided.

Outline of Embodiments of Present Invention

First, an outline of embodiments of the present invention is described.

(1) A multi-core flat cable for vehicle comprises:

two power wires each of which comprises a first conductor and a first insulating layer covering the first conductor;

two signal wires each of which comprises a second conductor thinner than the first conductor and a second insulating layer covering the second conductor; and a sheath covering the two power wires, and at least the two signal wires, wherein a pair of the signal wires is twisted and is configured as one twisted pair of signal wires, and wherein on a section perpendicular to a longitudinal direction, a ratio (long-axis dimension/short-axis dimension) of a long-axis dimension to a short-axis dimension is equal to or greater than 1.8.

According to the multi-core flat cable for vehicle having the above configuration, as compared to a configuration of separately arranging the two power wires and the twisted pair of signal wires, it is possible to reduce the arranging man-hour and to easily arrange in a small and flat arranging space. Since the short-axis dimension is small, it is possible to easily bend the cable in a short-axis direction (thickness direction). Since the long-axis dimension is large, it is possible to largely secure a contact area with an attaching part such as a wall of a vehicle body, so that it is possible to easily fix the multi-core flat cable to the vehicle. That is, the multi-core flat cable of the present invention can be easily secured to the vehicle.

(2) In the multi-core flat cable for vehicle according to (1), an outer diameter of the power wire may be 75% to 135% of an outer diameter of the twisted pair of signal wires.

According to the multi-core flat cable having the above configuration, since the sizes of the two power wires and the twisted pair of signal wires are adjusted with respect to each other, it is possible to easily form a cross-sectional shape into a flat shape such as a rectangular shape and an elliptical shape, and to easily handle the same.

(3) In the multi-core flat cable for vehicle according to (1), the twisted pair of signal wires may include a signal sheath covering the pair of signal wires twisted, and an outer diameter of the power wire may be 75% to 135% of an outer diameter of the signal sheath.

According to the multi-core flat cable having the above configuration, since the diameters of the power wires and the twisted pair of signal wires are substantially equivalent, an unevenness is less formed on a section of the multi-core flat cable, so that an outer shape thereof is favorable. Also, a twisted pattern of the twisted pair of signal wires is difficult to appear on the sheath, so that the outer shape is favorable. Also, when introducing the twisted pair of signal wires into a device, it is possible to easily make a device housing in contact with the twisted pair of signal wires.

(4) In the multi-core flat cable for vehicle according to one of (1) to (3), the two power wires may be disposed to be adjacent to each other.

According to the multi-core flat cable having the above configuration, when attaching the two power wires to the same connector, it is not necessary to rearrange the power wires, so that it is possible to easily perform the operation and to reduce a space for rearrangement.

(5) In the multi-core flat cable for vehicle according to (1), the two power wires and the twisted pair of signal wires may be aligned in line.

According to the multi-core flat cable having the above configuration, it is possible to reduce the dimension in the short-axis direction, so that it is possible to arrange the cable in a space having a lower height.

(6) The multi-core flat cable for vehicle according to one of (1) to (5), may further comprise:

two electric wires each of which comprises a third conductor thinner than the first conductor and a third insulating layer covering the third conductor.

According to the multi-core flat cable having the above configuration, the plurality of electric wires is integrated as the multi-core flat cable, so that it is possible to more easily arrange the same, as compared to a configuration of separately arranging the respective wires.

(7) In the multi-core flat cable for vehicle according to (6), a pair of the electric wires may be twisted and may be configured as a twisted pair of electric wires, the two power wires, the twisted pair of signal wires and the twisted pair of electric wires may be aligned in line, and the twisted pair of signal wires and the twisted pair of electric wires may be provided outside the two adjacent power wires.

According to the multi-core flat cable having the above configuration, the power wires, which are difficult to be bent, are disposed near the center, and the twisted pair of signal wires and the twisted pair of electric wires, which can be easily bent, are disposed at the outer side. Therefore, the symmetry of the multi-core flat cable is favorable and the multi-core flat cable has a less twisting tendency.

(8) In the multi-core flat cable for vehicle according to (7), a first connector to be connected to an electric brake of a vehicle may be provided at end portions of the power wires, and the twisted pair of signal wires having end portions at which a second connector to be connected to a wheel speed sensor of the vehicle may be provided is aligned to be adjacent to the power wires.

The electric brake and the wheel speed sensor are disposed at close positions. According to the multi-core flat cable having the above configuration, since the power wires and the twisted pair of signal wires are aligned to be adjacent to each other, there is no problem even if a space for rearranging the flat cable near the wheel is small.

(9) In the multi-core flat cable for vehicle according to (7), the power wires, the twisted pair of signal wires and the twisted pair of electric wires may be divided into two sub-units, and the power wires and/or the twisted pair of signal wires and/or the twisted pair of electric wires belonging to the same sub-unit may be twisted.

According to the multi-core flat cable having the above configuration, as compared to a configuration where all of the power wires and the twisted pair of signal wires are aligned in line, it is possible to reduce the size in the long-axis direction. Also, it is easy to maintain the outer shape of the sub-unit in a constant shape.

(10) In the multi-core flat cable for vehicle according to (9), the two sub-units may be wrapped by a wrapping tape, and the sheath may be positioned outside the wrapping tape.

According to the multi-core flat cable having the above configuration, it is easy to maintain the aligned state of the two sub-units.

(11) In the multi-core flat cable for vehicle according to (9), each of the sub-units may be wrapped by a wrapping tape, and the sheath may be positioned outside each of the wrapping tapes.

According to the multi-core flat cable having the above configuration, it is easy to take out the power wire and the twisted wire from each sub-unit.

(12) In the multi-core flat cable for vehicle according to one of (9) to (11), the two power wires may belong to the different sub-units.

According to the multi-core flat cable having the above configuration, it is easy to match the bendability of each sub-unit, and the multi-core flat cable has the less bending deviation and twisting tendency.

(13) In the multi-core flat cable for vehicle according to one of (9) to (11), the two power wires may belong to the same sub-unit.

According to the multi-core flat cable having the above configuration, since the two power wires are disposed at the close positions, it is easy to attach the respective power wires to the common connector.

(14) In the multi-core flat cable for vehicle according to one of (9) to (13), an insulation-coated electric wire may be provided in the vicinity of a contact portion of the two sub-units.

According to the multi-core flat cable having the above configuration, it is possible to increase the number of wires to be accommodated in the sheath without increasing the outer diameter of the multi-core flat cable.

Details of Embodiments of Present Invention

In the below, embodiments of the multi-core flat cable of the present invention will be described in detail with reference to the drawings.

In the meantime, the present invention is not limited to the embodiments, is defined in the claims, and includes all changes made within the meaning and scope equivalent to the claims.

First Embodiment

A multi-core flat cable 1 is used so as to connect ECU (Electric Control Unit) mounted on a vehicle and an electric brake, an electric parking brake, a wheel speed sensor and the like provided around a wheel, for example. The wheel is supported to a vehicle body to be displaceable about an axle. Also, the wheel may be supported via a suspension device and a steering device. That is, the wheel is displaceably supported to the vehicle body. In the first embodiment, the multi-core flat cable 1 is favorably used so as to connect the ECU fixed to the vehicle body and a component that is mounted to the wheel displaceably supported to the vehicle body.

The multi-core flat cable 1 is required to be arranged in a small space in a tire house in which the wheel is to be accommodated, and to be easily bendable so as not to interfere with displacement of the wheel, to be easily arranged in a flat arranging space, to be easily secured to the vehicle, and to have durability.

FIG. 1 is a sectional view depicting the multi-core flat cable 1 in accordance with the first embodiment of the present invention. FIG. 1 depicts a section perpendicular to a longitudinal direction of the multi-core flat cable 1. As shown in FIG. 1, the multi-core flat cable 1 includes two power wires 10, and two signal wires 21.

(Power Wire 10)

The two power wires 10 include, respectively, a first conductor 12, and a first insulating layer 13 configured to cover the first conductor 12. The two power wires 10 have the same size and are made of the same material. The power wire is used for transmitting electricity.

The two power wires 10 are used to connect the electric brake (including an electric parking brake) and the ECU. The electric brake has a motor configured to drive a brake caliper. For example, one power wire 10 is used as a power feeding wire configured to feed power to the motor and the other power wire 10 can be used as an earth wire of the motor.

The first conductor 12 is configured by stranding a plurality of conductors. The conductor is a wire made of copper or copper alloy. The conductor may be made of a material having predetermined conductivity and flexibility such as copper wire and copper alloy wire. A cross-sectional area of the first conductor 12 may be set to 1.5 mm$^2$ to 3 mm$^2$.

The first insulating layer 13 is formed of a flame-retardant polyolefin-based resin. The first insulating layer 13 may be formed of crosslinked flame-retardant polyethylene having a flame retardant mixed thereto. The material of the first insulating layer 13 is not limited to the flame-retardant polyolefin-based resin (EVA (ethylene-vinyl acetate copolymer), EEA (ethylene-ethyl acrylate copolymer), EMA (ethylene-methyl acrylate copolymer) and the like), and the other materials such as crosslinked fluorine-based resin can also be used. An outer diameter of the first insulating layer 13 may be set to 2 mm to 4 mm.

(Signal Wire 21)

The two signal wires 21 include, respectively, a second conductor 22 thinner than the first conductor 12 and a second insulating layer 23 configured to cover the second conductor 22. The two signal wires 21 to be twisted have the same size and are made of the same material. A pair of the signal wires 21 is twisted and is configured as a twisted pair 20 of signal wires. A twisting pitch of the twisted pair 20 of signal wires may be set to 10 to 15 times of a twist diameter of the twisted pair 20 of signal wires (an outer diameter of the twisted pair 20 of signal wires).

The outer diameter of the twisted pair 20 of signal wires may be set to be substantially the same as an outer diameter of the power wire 10. The outer diameter of the power wire 10 is preferably 75% to 135% of the outer diameter of the twisted pair 20 of signal wires. The outer diameter of the power wire 10 is more preferably 90% to 115% of the outer diameter of the twisted pair 20 of signal wires.

The signal wire 21 can be used to transmit a signal from a sensor or to transmit a control signal from the ECU. The two signal wires 21 can be used for wiring of an ABS (Anti-lock Brake System), for example. The two signal wires 21 can be respectively used as a wire for connecting a differential wheel speed sensor and an ECU of a vehicle, for example.

The second conductor 22 may be configured by one conductor, or may be configured by stranding a plurality of conductors, like the power wire 10, as shown. The second conductor 22 may be formed of a material, which is the same as or different from the conductor configuring the first conductor 12. A cross-sectional area of the second conductor 22 may be set to 0.13 mm$^2$ to 0.5 mm$^2$.

The second insulating layer 23 may be formed of a material, which is the same as or different from the first insulating layer 13. An outer diameter of the second insulating layer 23 may be set to 1.0 mm to 2.2 mm.

The twisted pair 20 of signal wires may have a signal sheath 24 configured to cover the pair of the signal wires 21 twisted. The signal sheath 24 may be formed of a material, which is the same as or different from the second insulating layer 23. The signal sheath may be configured by wrapping a tape or by an extruded resin tube. The outer diameter of the power wire 10 may be set to 75% to 135% of an outer diameter of the signal sheath 24.

(Sheath 40)

The sheath 40 is configured to cover all the wires including the two power wires 10 and the two signal wires 21. The two power wires 10 and one twisted pair 20 of signal wires are aligned in parallel with each other. The sheath 40 covers the two power wires 10 and one twisted pair 20 of signal wires aligned in parallel with each other.

In the meantime, the sheath 40 may include an inner sheath 41 and an outer sheath 42 positioned at an outermore side than the inner sheath 41.

The inner sheath 41 is configured to keep an aligned shape of all the wires including the two power wires 10 and the two signal wires 21. The inner sheath 41 is formed by extruding and coating the same on outer peripheries of the two power wires 10 and the two signal wires 21. The inner sheath 41 may be formed of the same material as the outer sheath 42 or a resin different from the outer sheath 42. The inner sheath 41 may be formed of a polyolefin-based resin such as polyethylene and ethylene-vinyl acetate copolymer (EVA), polyurethane elastomer, polyester elastomer or crosslinked polyethylene formed by mixing at least two thereof.

The outer sheath 42 is provided so as to protect all the wires including the two power wires 10 and the two signal wires 21 from an outside. The outer sheath 42 is formed by extruding and coating the same on an outer periphery of the inner sheath 41. The outer sheath 42 may be formed of crosslinked/non-crosslinked polyurethane (TPU) having excellent abrasion resistance, for example. Due to the excellent heat resistance, the outer sheath 42 is preferably formed of crosslinked polyurethane.

On a section perpendicular to a longitudinal direction of the multi-core flat cable 1, a ratio (long-axis dimension L2/short-axis dimension L1) of a long-axis dimension L2 of the sheath 40 to a short-axis dimension L1 is set to 1.8 or greater. When the ratio L2/L1 is smaller than 1.8, it is difficult to largely secure an adhesion area when fixing the multi-core flat cable 1 to a wall of the vehicle, for example. Also, a thickness (the short-axis dimension) of the multi-core flat cable 1 excessively increases with respect to a width dimension (the long-axis dimension), so that it is difficult to bend the cable. The ratio L2/L1 is preferably set to 1.8 to 3.0. The ratio L2/L1 is more preferably set to 1.8 to 2.7. In the first embodiment, the ratio L2/L1 is 2.4.

The dimension in the long-axis direction L2 of the sheath 40 may be set to 9 mm to 30 mm, and the dimension in the short-axis direction L1 may be set to 3 mm to 9 mm. Also, the thickness of the sheath 40 may be set to 0.3 mm to 1.0 mm.

(Filler 50)

The multi-core flat cable 1 includes a filler 50. The filler 50 is provided inside the sheath 40. The filler 50 may be provided in a gap formed by the two power wires 10, a gap between the two power wires 10 or between the power wire 10 and the signal wire 21. The filler 50 may be configured by easily slidable fiber such as spun rayon yarn and nylon yarn. The filler 50 may be configured by tensile strength fiber.

In order to increase the abrasion resistance of the multi-core flat cable 1, the filler 50 may be formed by extruding crosslinked/non-crosslinked polyurethane (TPU). Alternatively, in order to increase the bendability of the multi-core flat cable 1, the filler 50 may be configured by the spun rayon yarn and nylon yarn having a buffer function.

(Wrapping Tape 51)

The multi-core flat cable 1 may have a wrapping tape 51. The wrapping tape 51 is configured to cover the two power wires 10 and one twisted pair 20 of signal wires. The wrapping tape 51 is configured to stably keep the aligned shape of the wires. The wrapping tape 51 is provided inside the sheath 40.

As the wrapping tape 51, a paper tape, a non-woven fabric tape, a resin tape such as polyester and the like can be used. Also, the wrapping tape 51 may be spirally wrapped or longitudinally wrapped onto the two power wires 10 and one twisted pair 20 of signal wires. Also, a wrapping direction may be a Z wrapping or S wrapping direction. Also, the wrapping direction may be the same direction as the pair twisting direction of the twisted pair 20 of signal wires or may be an opposite direction thereto. The wrapping direction of the wrapping tape 51 and the pair twisting direction of the twisted pair 20 of signal wires are preferably opposite to each other because an unevenness is difficult to be formed on a surface of the wrapping tape 51 and the outer shape of the multi-core flat cable 1 can be easily stable.

Also, when providing the sheath 40 of resin by the extrusion coating, the resin enters between the two power wires 10, so that it may be difficult to separate the two power wires 10 at a terminal of the multi-core flat cable 1. However, the wrapping tape 51 is provided, so that it is possible to prevent the resin from entering between the two power wires 10 and to easily take out the two power wires 10 from the terminal.

(Shield Layer)

The multi-core flat cable 1 may have a shield layer for suppressing a noise to be emitted outside. The shield layer may be configured by wrapping a metal tape onto the power wires 10 and the twisted pair 20 of signal wires. The shield layer may also be configured by spirally wrapping a plurality of thin metal wires onto the wires. Alternatively, the shield layer may also be configured by braiding the thin metal wires. The shield layer may be provided outside the wrapping tape 51.

Effects

According to the multi-core flat cable for vehicle 1 of the first embodiment, it is possible to arrange the two power wires 10 and the twisted pair 20 of signal wires at one time, and to reduce the arranging man-hour, as compared to a configuration of separately arranging the wires. Also, since the two power wires 10 and the twisted pair 20 of signal wires are integrated as the single multi-core flat cable 1, a space required for the arranging is reduced, as compared to the configuration of separately arranging the two power wires 10 and the twisted pair 20 of signal wires. Also, the multi-core flat cable for vehicle 1 of the first embodiment can be easily arranged in a flat arranging space.

Also, since the multi-core flat cable 1 can be easily bent in the short-axis direction (thickness direction), it can be easily arranged on a bent path. Also, since the long-axis dimension is large, it is possible to largely secure the contact area with the attaching part such as a wall of the vehicle, for example, so that the multi-core flat cable 1 can be easily fixed to the vehicle. Also, since the ratio of the long-axis dimension to the short-axis dimension is equal to or greater than 1.8, it is possible to easily arrange the multi-core flat cable 1 in the flat arranging space.

For example, as compared to a multi-core cable having a circular section in which the two power wires and one twisted pair of signal wires are twisted, the multi-core flat cable 1 of the first embodiment can be easily bent in the thickness direction. Also, it is possible to largely secure the contact area at a fixing place, so that the cable can be easily secured.

In the multi-core flat cable 1 of the above configuration, the twisted pair 20 of signal wires has the signal sheath configured to cover the pair of the signal wires 21 twisted, and the outer diameter of the power wire 10 is 75% to 135% of the outer diameter of the signal sheath.

Since the diameters of the power wires 10 and the twisted pair 20 of signal wires are adjusted with respect to each other, the unevenness on the section of the multi-core flat cable 1 is reduced, and the wiring can be easily performed. Also, since the twisted pattern of the twisted pair 20 of signal wires tends not to appear on the sheath 40, the wiring can be easily performed. Also, when introducing the twisted pair 20 of signal wires into a device, a device housing is easy to be molded around the twisted pair 20 of signal wires.

On the section perpendicular to the longitudinal direction of the multi-core flat cable 1, a gap area S3(=S1−S2) obtained by subtracting a total sum S2 of cross-sectional areas of the first conductor 12 from an area S1 of a part surrounded by the first insulating layer 13 of the power wire 10 is preferably 5% to 20% of the area S1.

When the gap area S3 is less than 5%, the large bending stress is locally applied to the first conductor 12 upon the bending of the multi-core flat cable 1, so that the bending resistance may be deteriorated. When the gap area S3 is greater than 20%, the power wires 10 move excessively freely, so that it may be difficult to perform the processing.

In the meantime, the gap area S3 may be obtained by image processing of binarizing a shade of a photograph of the section of the multi-core flat cable 1 into a conductor part and a gap part, specifying a first conductor part from the conductor part, and subtracting an area of the first conductor part from an area of the part surrounded by the first insulating layer. For example, an image is made into two levels by software such as "Paintshoppro" (a product of Corel Company). A threshold is adjusted with naked eyes so that a conductor boundary is to be correctly distinguished, and the binarization is made with a histogram. By specifying the first conductor part with naked eyes, it is possible to obtain the total sum S2 of the cross-sectional areas of the first conductor, the area S1 of the part surrounded by the sheath, and the gap area S3.

Second Embodiment

Figure 2:
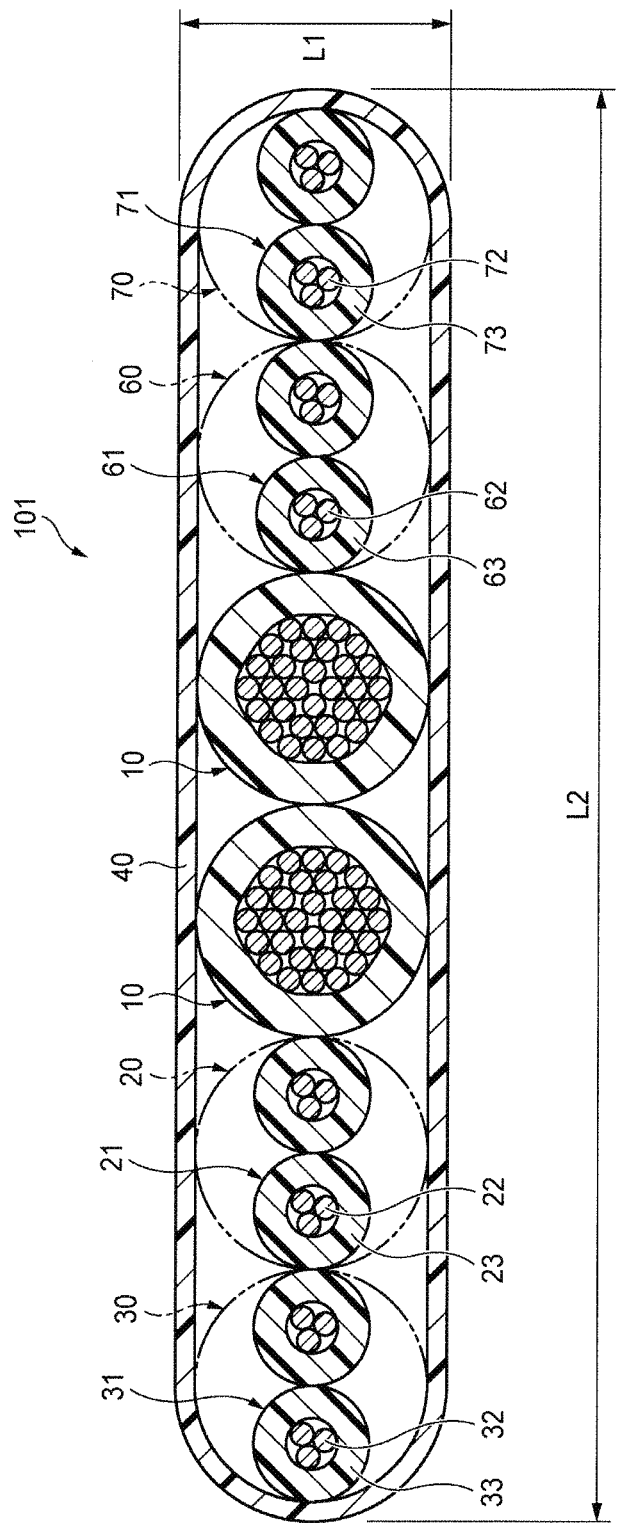
FIG. 2 is a sectional view depicting a multi-core flat cable for vehicle in accordance with a second embodiment of the present invention.

In the first embodiment, the multi-core flat cable 1 having the two power wires 10 and the two signal wires 21 has been described. However, the present invention is not limited thereto. FIG. 2 is a sectional view depicting a multi-core flat cable for vehicle 101 in accordance with a second embodiment of the present invention.

As shown in FIG. 2, the multi-core flat cable 101 of the second embodiment includes the two power wires 10, one twisted pair 20 of signal wires configured by the two signal wires 21, one twisted pair 30 of electric wires configured by two electric wires 31, one second twisted pair 60 of electric wires configured by two electric wires 61, and one third twisted pair 70 of electric wires configured by two electric wires 71. The two power wires 10, one twisted pair 20 of signal wires, one twisted pair 30 of electric wires, one second twisted pair 60 of electric wires, and one third twisted pair 70 of electric wires are aligned in line and are covered by the sheath 40. On a section perpendicular to a longitudinal direction of the multi-core flat cable 101, the ratio (L2/L1) of the long-axis dimension L2 to the short-axis dimension L1 is equal to or greater than 1.8. In the second embodiment, the ratio L2/L1 is 4.6. The ratio L2/L1 may be set to 7 or smaller.

(Twisted Pair 30 of Electric Wires)

The two electric wires 31 include, respectively, a third conductor 32 thinner than the first conductor 12 and a third insulating layer 33 configured to cover the third conductor 32. A pair of the two electric wires 31 is twisted and is configured as a twisted pair 30 of electric wires. The two electric wires 31 to be twisted have the same size and are formed of the same material. The size and material of the electric wire 31 may be the same as those of the signal wire 21.

An outer diameter of the twisted pair 30 of electric wires may be set to be substantially the same as the outer diameter of the twisted pair 20 of signal wires. The outer diameter of the twisted pair 30 of electric wires may be set to be substantially the same as the outer diameter of the power wire 10. The outer diameter of the power wire 10 is preferably 75% to 135% of the outer diameter of the twisted pair 30 of electric wires. The outer diameter of the power wire 10 is more preferably 90% to 115% of the outer diameter of the twisted pair 30 of electric wires.

The electric wire 31 can be used to transmit a signal from a sensor and to transmit a control signal from the ECU, and can also be used as a power feeding wire for feeing power to an electronic device. The electric wire 31 can be used as a power feeding wire, a control wire and a sensor wire, which are to be used for a damper control system configured to change a hydraulic characteristic of the suspension, for example. Alternatively, the electric wire 31 can be used for wiring of an in-vehicle network.

The third conductor 32 may be configured by one conductor, or may be configured by stranding a plurality of conductors, like the power wire 10. The third conductor 32 may be formed of a material, which is the same as or different from the conductor configuring the first conductor 12 or the second conductor 22. A cross-sectional area of the third conductor 32 may be set to 0.13 mm$^2$ to 0.5 mm$^2$.

The third insulating layer 33 may be formed of a material, which is the same as or different from the second insulating layer 23. An outer diameter of the third insulating layer 33 may be set to 1.0 mm to 2.2 mm.

(Second Twisted Pair 60 of Electric Wires)

The second twisted pair 60 of electric wires is configured by a pair of the electric wires 61 twisted and configured as a twisted pair of electric wires. The two electric wires 61 include, respectively, a fourth conductor 62 thinner than the first conductor 12 and a fourth insulating layer 63 configured to cover the fourth conductor 62. The two electric wires 61 have the same size and are made of the same material (Third Twisted Pair 70 of Electric Wires)

The third twisted pair 70 of electric wires is configured by a pair of the electric wires 71 twisted and configured as a twisted pair of electric wires. The two electric wires 71 include, respectively, a fifth conductor 72 thinner than the first conductor 12 and a fifth insulating layer 73 configured to cover the fifth conductor 72. The two electric wires 71 have the same size and are made of the same material.

The second twisted pair 60 of electric wires and the third twisted pair 70 of electric wires may be configured by the material, size and use similar to the twisted pair 30 of electric wires.

(Effects)

According to the multi-core flat cable for vehicle 101 of the second embodiment, it is possible to arrange the two power wires 10, one twisted pair 20 of signal wires, one twisted pair 30 of electric wires, one second twisted pair 60 of electric wires, and one third twisted pair 70 of electric wires at one time, and to reduce the arranging man-hour, as compared to a configuration of separately arranging the wires. Also, since the wires are integrated as the single multi-core flat cable 101, a space required for the arranging is reduced, as compared to the configuration of separately arranging the wires. Also, the multi-core flat cable for vehicle 101 of the second embodiment can be easily arranged in the flat arranging space.

Also, since the multi-core flat cable 101 can be easily bent in the short-axis direction (thickness direction), it can be easily arranged on a bent path. Also, since the long-axis dimension is large, it is possible to largely secure the contact area with the attaching part such as a wall of the vehicle, for example, so that the multi-core flat cable 101 can be easily fixed to the vehicle. Also, since the ratio of the long-axis dimension to the short-axis dimension is equal to or greater than 1.8, it is possible to easily arrange the multi-core flat cable 101 in the flat arranging space.

As shown in the multi-core flat cable 101 of the second embodiment, the power wires, the twisted pair of signal wires, the twisted pair of electric wires, the second twisted pair of electric wires, and the third twisted pair of electric wires are preferably made to have the outer diameters, which are substantially the same. Specifically, the outer diameter of each wire (power wire or twisted wire) is preferably 75% to 135% of the outer diameter of the twisted pair of signal wires. The outer diameter of each wire (power wire or twisted wire) is more preferably 90% to 115% of the outer diameter of the twisted pair of signal wires. As shown in FIG. 2, the thickness of the multi-core flat cable configured by the respective wires (power wires or twisted wires) aligned in line is substantially constant in the width direction and the unevenness is difficult to be formed on the surface of the multi-core flat cable, so that an outer shape thereof is favorable.

The outer diameter of the power wire 10 means the outer diameter of the first insulating layer 13. The outer diameter of each twisted wire means a diameter of a virtual circumscribed circle on which the pair of signal wires 21 is circumscribed. For example, the outer diameter of the twisted pair 20 of signal wires can be measured by sandwiching the two twisted signal wires 21 with a micrometer.

According to the multi-core flat cable 101 of the second embodiment, since the sizes of the two power wires 10 and the twisted pair 20 of signal wires are adjusted with respect to each other, it is possible to easily form a sectional shape of the cable into a rectangular shape and to easily handle the cable.

In the multi-core flat cable 101 of the second embodiment, the sizes of the twisted pair 30 of electric wires, the second twisted pair 60 of electric wires and the third twisted pair 70 of electric wires are also adjusted with respect to the power wires 10. For this reason, it is possible to easily form a sectional shape of the cable into a rectangular shape and to easily handle the cable.

The multi-core flat cable 101 of the above configuration further includes the two electric wires 31, 61, 71. The plurality of the electric wires is integrated as the multi-core flat cable 101, so that it is possible to easily perform the arranging operation, as compared to a configuration of separately arranging the respective wires.

In the multi-core flat cable 101 of the above configuration, the twisted pair 20 of signal wires, the twisted pair 30 of electric wires, the second twisted pair 60 of electric wires, and the third twisted pair 70 of electric wires are provided outside the two adjacent power wires 10. Since the power wires 10, which are difficult to be bent, are disposed near the center and the twisted pair 20 of signal wires, the twisted pair 30 of electric wires, the second twisted pair 60 of electric wires, and the third twisted pair 70 of electric wires, which can be easily bent as compared to the power wires 10, are disposed at the outer side, the symmetry of the multi-core flat cable 101 is favorable and the multi-core flat cable 101 has a less twisting tendency.

Figure 3:
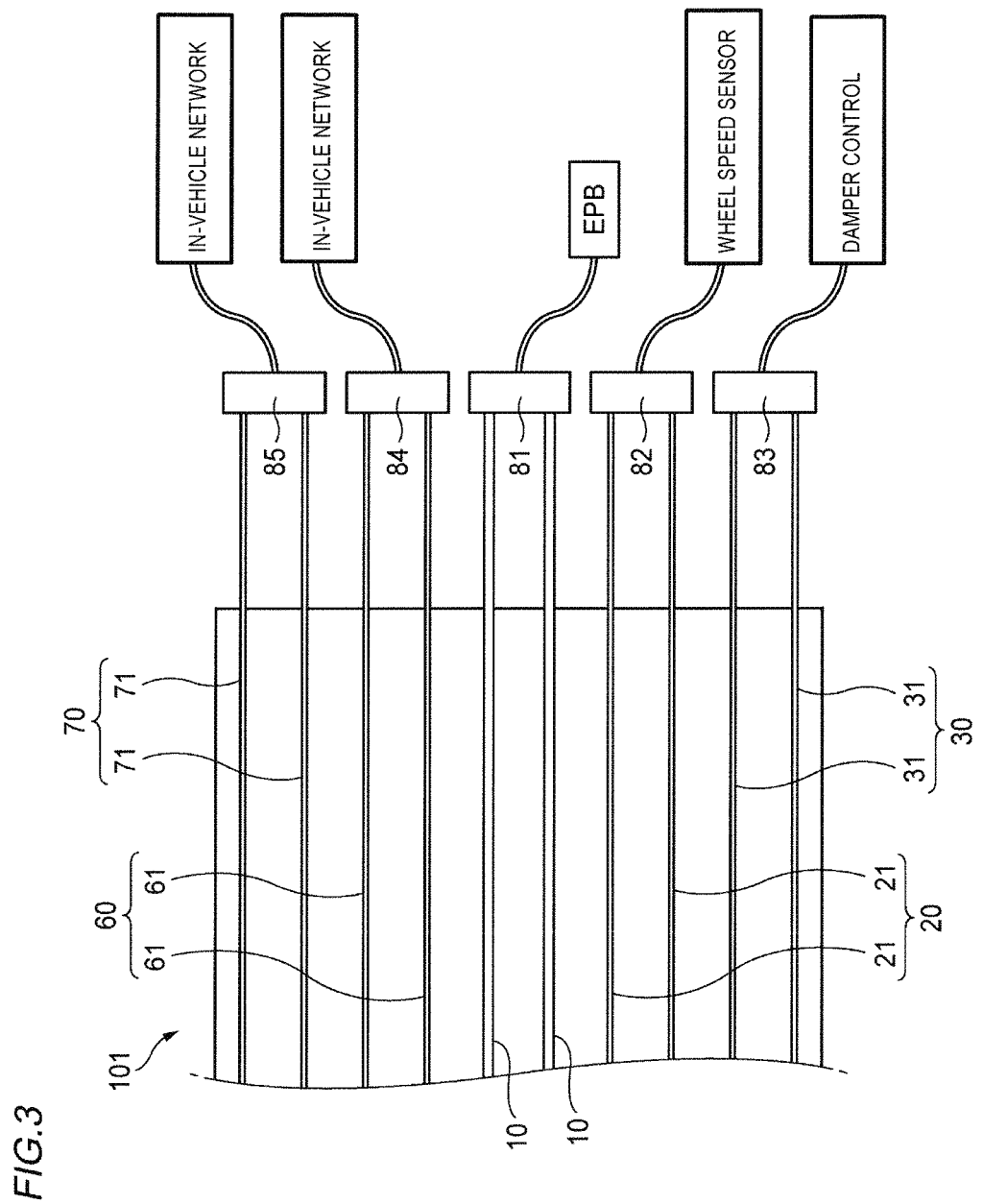
FIG. 3 is a pictorial view depicting a connection example of the multi-core flat cable for vehicle in accordance with the second embodiment of the present invention.

FIG. 3 is a pictorial view depicting a connection example of the multi-core flat cable for vehicle 101 in accordance with the second embodiment of the present invention.

As shown in FIG. 3, a first connector 81 connected to an electric parking brake of a vehicle and a second connector 82 connected to a wheel speed sensor of the vehicle are connected to end portions of the power wires 10. The first connector 81 is connected with the two power wires 10. The second connector 82 is connected with the two signal wires 21 of the twisted pair 20 of signal wires. The two power wires and one twisted pair 20 of signal wires are aligned to be adjacent to each other.

The electric parking brake and the wheel speed sensor are arranged at close positions. The electric parking brake and the wheel speed sensor are all provided in the vicinity of the wheel of the vehicle. The electric parking brake and the wheel speed sensor are mounted to a member that is configured to be displaced together with the wheel relative to a vehicle body. For this reason, the first connector 81 connected to the electric parking brake and the second connector 82 connected to the wheel speed sensor are provided at positions close to each other.

According to the multi-core flat cable 101 of the second embodiment, since the power wires 10 and the twisted pair 20 of signal wires are aligned to be adjacent to each other, the power wires 10 and the twisted pair 20 of signal wires are positioned to be close to each other. For this reason, it is possible to easily connect the power wires 10 and the twisted pair 20 of signal wires positioned to be close to each other to the first connector 81 and the second connector 82 positioned to be close to each other. Also, when connecting the power wires 10 to the electric parking brake and the twisted pair 20 of signal wires to the wheel speed sensor, there is no problem even if a space for re-arranging the respective wires is small.

On the other hand, each electric wire 31 of the twisted pair 30 of electric wires can be connected to a damper control system via a third connector 83. Each electric wire 61 of the second twisted pair 60 of electric wires can be connected to an in-vehicle network via a fourth connector 84. Each electric wire 71 of the third twisted pair 70 of electric wires can be connected to the in-vehicle network via a fifth connector 85.

Third Embodiment

Figure 4:
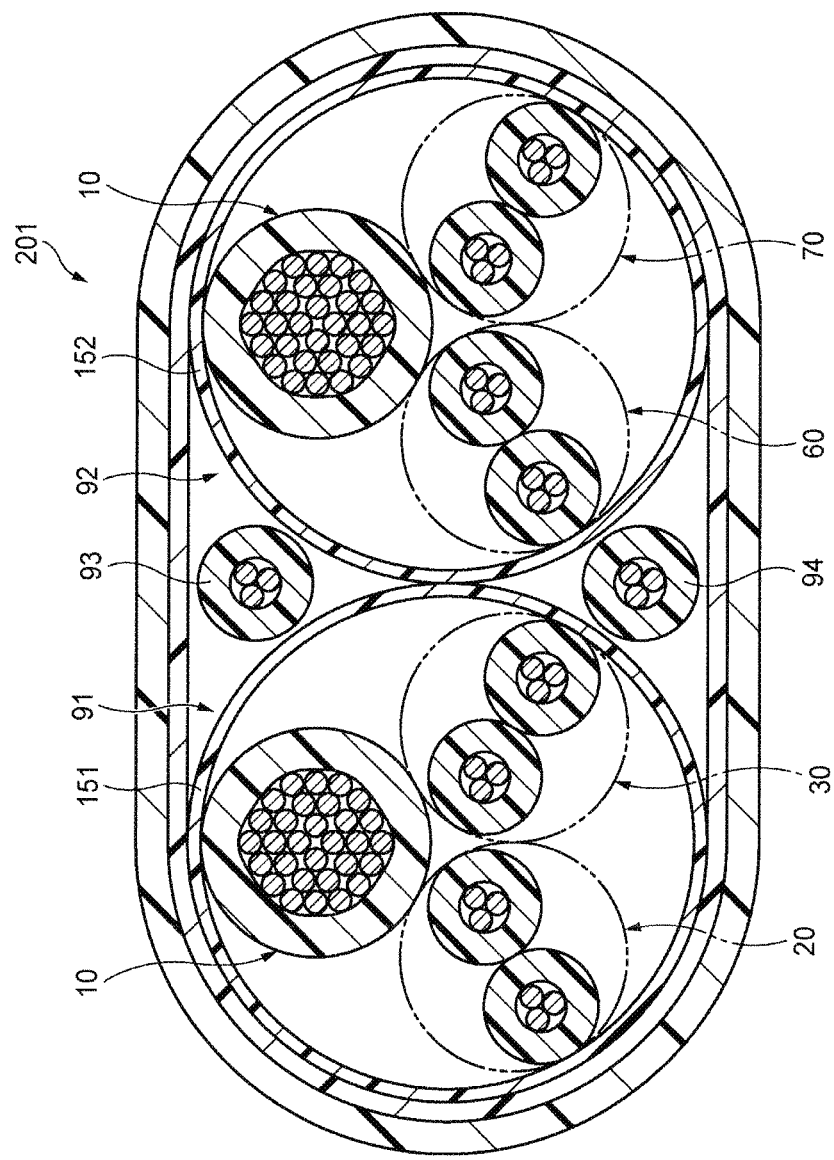
FIG. 4 is a sectional view depicting a multi-core flat cable for vehicle in accordance with a third embodiment of the present invention.

FIG. 4 is a sectional view depicting a multi-core flat cable for vehicle 201 in accordance with a third embodiment of the present invention.

In the first embodiment and the second embodiment, the multi-core flat cables 1, 101 in which the power wires 10, the signal wire 21, and the electric wire 31, 61, 71 are respectively aligned in line have been described. However, the present invention is not limited thereto. For example, as shown in FIG. 4, a plurality of sub-units 91, 92 each of which is formed by stranding a plurality of wires may be aligned in line. As compared to the configuration where all the wires such as the power wires 10 are aligned in line, it is possible to reduce the dimension in the long-axis direction on the section.

In the multi-core flat cable 201 of the third embodiment, the power wires 10, the twisted pair 20 of signal wires, the twisted pair 30 of electric wires, the second twisted pair 60 of electric wires, and the third twisted pair 70 of electric wires are divided in the two sub-units 91, 92. The first sub-unit 91 and the second sub-unit 92 are not twisted each other, and are aligned to be parallel with each other.

In the shown example, one power wire 10, one twisted pair 20 of signal wires and one twisted pair 30 of electric wires belong to the first sub-unit 91. One power wire 10, one twisted pair 20 of signal wires and one twisted pair 30 of electric wires are twisted. A wrapping tape 151 (tape of paper or chemical fiber) covers the twisted one power wire 10, one twisted pair 20 of signal wires and one twisted pair 30 of electric wires.

One power wire 10, one second twisted pair 60 of electric wires and one third twisted pair 70 of electric wires belong to the second sub-unit 92. One power wire 10, one second twisted pair 60 of electric wires and one third twisted pair 70 of electric wires are twisted. A wrapping tape 152 covers the twisted one power wire 10, one second twisted pair 60 of electric wires and one third twisted pair 70 of electric wires.

The wires belonging to each of the sub-units 91, 92 are twisted. For this reason, it is easy to maintain the outer shape of each of the sub-units 91, 92 in a constant shape. By the wrapping tapes 151, 152, the twisted state of each wire is stably maintained. The sheath 40 is provided on outer sides of the wrapping tapes 151, 152. The sheath 40 is provided on the outer side of each of the wrapping tapes 151, 152. Even when the sheath 40 is removed, since the wrapping tapes 151, 152 maintain the twisted state of each of the sub-units 91, 92, it is easy to take out the wires such as the power wires 10 from the sub-units 91, 92.

Also, as shown, insulated electric wires 93, 94 insulation-coated may be provided in the vicinity of the contact portion of the two sub-units 91, 92.

Fourth Embodiment

Figure 5:
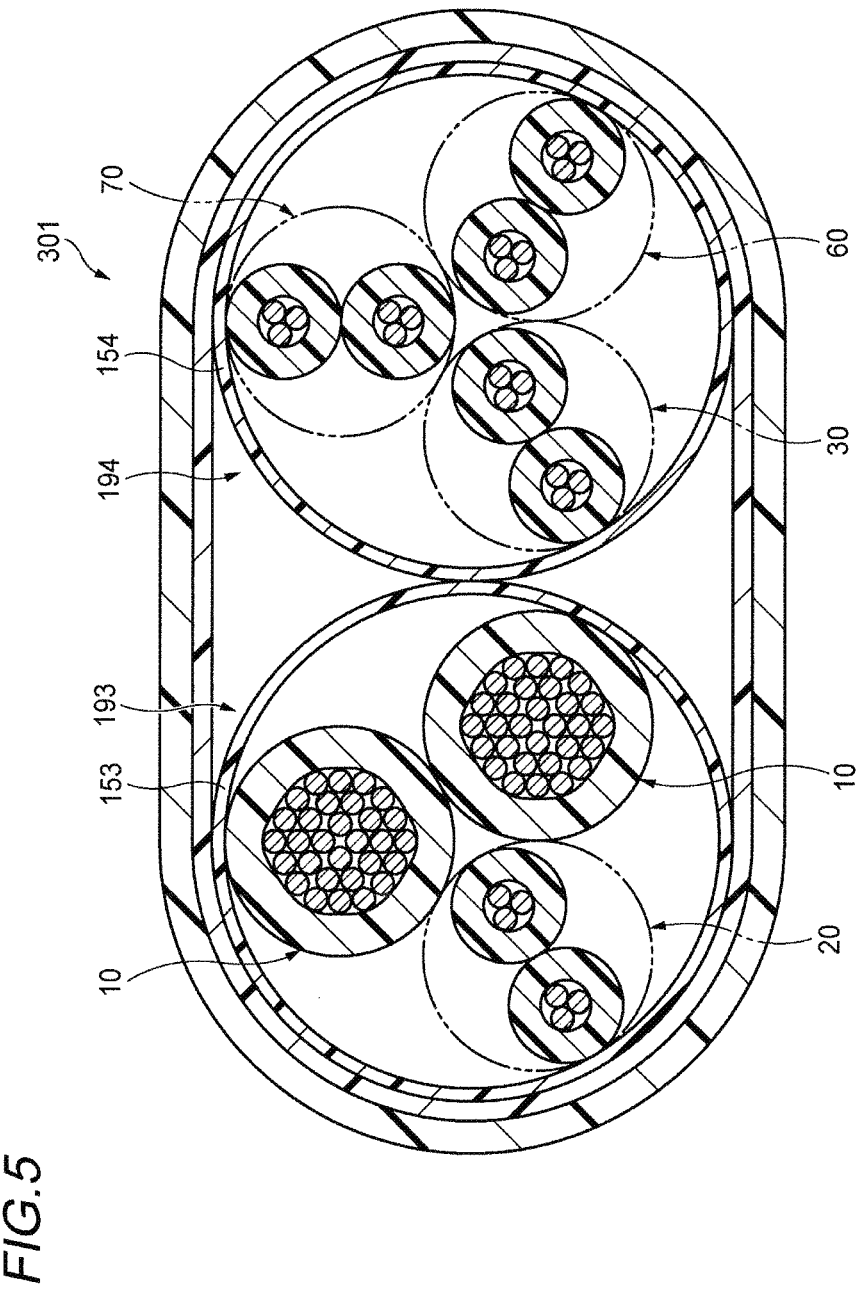
FIG. 5 is a sectional view depicting a multi-core flat cable for vehicle in accordance with a fourth embodiment of the present invention.

In the third embodiment, the multi-core flat cable 201 in which the two power wires 10 belong to the different sub-units 91, 92 has been described. However, the present invention is not limited thereto. A multi-core flat cable 301 of a fourth embodiment of the present invention shown in FIG. 5 includes the electric wires similar to the third embodiment, and is also similar to the third embodiment, in that the two sub-units having the substantially same sizes are disposed in parallel. In the fourth embodiment, the two power wires 10 belong to the same third sub-unit 193. FIG. 5 is a sectional view depicting the multi-core flat cable 301 in accordance with the fourth embodiment of the present invention.

As shown in FIG. 5, the two power wires 10 and one twisted pair 20 of signal wires belong to the third sub-unit 193. The two power wires 10 and one twisted pair 20 of signal wires are twisted each other. A wrapping tape 153 covers the twisted two power wires 10 and one twisted pair 20 of signal wires.

One twisted pair 30 of electric wires, one second twisted pair 60 of electric wires, and one third twisted pair 70 of electric wires belong to a fourth sub-unit 194. One twisted pair 30 of electric wires, one second twisted pair 60 of electric wires, and one third twisted pair 70 of electric wires are twisted each other. A wrapping tape 154 covers the twisted one twisted pair 30 of electric wires, one second twisted pair 60 of electric wires, and one third twisted pair 70 of electric wires.

By the wrapping tapes 153, 154, the twisted state of each wire is stably maintained. The third sub-unit 193 and the fourth sub-unit 194 are not twisted, and are aligned to be parallel with each other.

According to the multi-core flat cable 301 of the fourth embodiment, the two power wires 10 belong to the same third sub-unit 193. Since the two power wires 10 are disposed at positions close to each other, it is easy to attach the respective power wires 10 to the connectors.

In the meantime, the method of separating the power wires 10, the twisted pair 20 of signal wires and the twisted pair 30 of electric wires into the two sub-units is not limited to the third embodiment and the fourth embodiment. That is, following configurations are possible.

The two power wires 10 and the twisted pair 20 of signal wires may belong to one sub-unit, and the twisted pair 30 of electric wires may belong to the other sub-unit.

The two power wires 10 and the twisted pair 30 of electric wires may belong to one sub-unit, and the twisted pair 20 of signal wires may belong to the other sub-unit.

The two power wires 10 may belong to one sub-unit, and the twisted pair 20 of signal wires and the twisted pair 30 of electric wires may belong to the other sub-unit.

One power wire 10 and the twisted pair 20 of signal wires may belong to one sub-unit, and one power wire 10 and the twisted pair 30 of electric wires may belong to the other sub-unit.

One power wire 10 and the twisted pair 30 of electric wires may belong to one sub-unit, and one power wire 10 and the twisted pair 20 of signal wires may belong to the other sub-unit.

One power wire 10, the twisted pair 20 of signal wires and the twisted pair 30 of electric wires may belong to one sub-unit, and one power wire 10 may belong to the other sub-unit (an example of the third embodiment)

Meanwhile, in the first embodiment and the second embodiment, the plurality of wires is aligned in line on the section. However, the present invention is not limited thereto. For example, a plurality of wires may be aligned in multiple lines inasmuch as the ratio (L2/L1) of the long-axis dimension L2 to the short-axis dimension L1 on the section is equal to or greater than 1.8.

DESCRIPTION OF REFERENCE NUMERALS 1, 101: multi-core flat cable
10: power wire
12: first conductor
13: first insulating layer
20: twisted pair of signal wires
21: signal wire
22: second conductor
23: second insulating layer
30: twisted pair of electric wires
31: electric wire
32: third conductor
33: third insulating layer
40: sheath
41: inner sheath
42: outer sheath
50: filler
51, 151, 152, 153, 154: wrapping tape
60: second twisted pair of electric wires
61: electric wire
62: fourth conductor
63: fourth insulating layer
70: third twisted pair of electric wires
71: electric wire
72: fifth conductor
73: fifth insulating layer

The invention claimed is:

1. A multi-core flat cable for vehicle comprising:
two power wires, each of which comprising a first conductor and a first insulating layer covering the first conductor;
two signal wires, each of which comprising a second conductor thinner than the first conductor and a second insulating layer covering the second conductor; and
a sheath covering the two power wires and the two signal wires,
wherein a pair of the signal wires is twisted and is configured as one twisted pair of signal wires,
wherein the two power wires and the twisted pair of signal wires are aligned in line,
wherein the two power wires are disposed to be adjacent to each other and to be in contact with each other,
wherein one of the two power wires and the twisted pair of signal wires are disposed to be adjacent to each other and to be in contact with each other, and
wherein on a section perpendicular to a longitudinal direction, a ratio (long-axis dimension/short-axis dimension) of a long-axis dimension to a short-axis dimension is equal to or greater than 1.8.

2. The multi-core flat cable for vehicle according to claim 1, wherein an outer diameter of the power wire is 75% to 135% of an outer diameter of the twisted pair of signal wires.

3. The multi-core flat cable for vehicle according to claim 1, wherein the twisted pair of signal wires includes a signal sheath covering the pair of signal wires twisted, and
wherein an outer diameter of the power wire is 75% to 135% of an outer diameter of the signal sheath.

4. The multi-core flat cable for vehicle according to claim 1, further comprising:
two first electric wires, each of which comprising a third conductor thinner than the first conductor and a third insulating layer covering the third conductor.

5. The multi-core flat cable for vehicle according to claim 4, wherein a pair of the first electric wires is twisted and is configured as a first twisted pair of electric wires,
wherein the two power wires, the twisted pair of signal wires and the first twisted pair of electric wires are aligned in line, and
wherein the twisted pair of signal wires and the first twisted pair of electric wires are disposed to be adjacent to each other and to be in contact with each other.

6. The multi-core flat cable for vehicle according to claim 5, wherein a first connector to be connected to an electric brake of a vehicle is provided at end portions of the power wires, and
wherein the twisted pair of signal wires having end portions at which a second connector to be connected to a wheel speed sensor of the vehicle is provided is aligned to be adjacent to the power wires.

7. The multi-core flat cable for vehicle according to claim 5, further comprising:
two second electric wires, each of which comprising a fourth conductor thinner than the first conductor and a fourth insulating layer covering the fourth conductor; and
two third electric wires, each of which comprising a fifth conductor thinner than the first conductor and a fifth insulating layer covering the fifth conductor,
wherein a pair of the second electric wires is twisted and is configured as one second twisted pair of electric wires,
wherein a pair of the third electric wires is twisted and is configured as one third twisted pair of electric wires,
wherein the two power wires, the twisted pair of signal wires, the first twisted pair of electric wires, the second twisted pair of electric wires, and the third twisted pair of electric wires are aligned in line,
wherein another of the two power wires and the second twisted pair of electric wires are disposed to be adjacent to each other and to be in contact with each other, and
wherein the second twisted pair of electric wires and the third twisted pair of electric wires are disposed to be adjacent to each other and to be in contact with each other.

8. The multi-core flat cable for vehicle according to claim 1, further comprising:
a wrapping tape provided inside the sheath and covering the two power wires and the twisted pair of signal wires,
wherein a wrapping direction of the wrapping tape and a pair twisting direction of the twisted pair of signal wires are opposite to each other.

9. A multi-core flat cable for vehicle comprising:
two power wires, each of which comprising a first conductor and a first insulating layer covering the first conductor;
two signal wires, each of which comprising a second conductor thinner than the first conductor and a second insulating layer covering the second conductor;
two first electric wires, each of which comprising a third conductor thinner than the first conductor and a third insulating layer covering the third conductor;
two second electric wires, each of which comprising a fourth conductor thinner than the first conductor and a fourth insulating layer covering the fourth conductor;
two third electric wires, each of which comprising a fifth conductor thinner than the first conductor and a fifth insulating layer covering the fifth conductor; and
a sheath covering the two power wires, the two signal wires, the two first electric wires, the two second electric wires, and the two third electric wires,
wherein a pair of the signal wires is twisted and is configured as one twisted pair of signal wires, and
wherein a pair of the first electric wires is twisted and is configured as one first twisted pair of electric wires,
wherein a pair of the second electric wires is twisted and is configured as one second twisted pair of electric wires,
wherein a pair of the third electric wires is twisted and is configured as one third twisted pair of electric wires,
wherein three of the two power wires, the twisted pair of signal wires, the first twisted pair of electric wires, the second twisted pair of electric wires, and the third twisted pair of electric wires form a first sub-unit by being twisted to be in contact with each other,
wherein a remaining three of the two power wires, the twisted pair of signal wires, the first twisted pair of electric wires, the second twisted pair of electric wires, and the third twisted pair of electric wires form a second sub-unit by being twisted to be in contact with each other,
wherein the first sub-unit includes at least one of the two power wires and the twisted pair of signal wires,
wherein the first sub-unit and the second sub-unit are disposed to be in parallel with each other and to be in contact with each other, and
wherein on a section perpendicular to a longitudinal direction, a ratio (long-axis dimension/short-axis dimension) of a long-axis dimension to a short-axis dimension is equal to or greater than 1.8.

10. The multi-core flat cable for vehicle according to claim 9, wherein the first sub-unit is wrapped by a first wrapping tape and the second sub-unit is wrapped by a second wrapping tape, and
wherein the sheath is positioned outside the first wrapping tape and the second wrapping tape.

11. The multi-core flat cable for vehicle according to claim 9, wherein another of the two power wires belong to the second sub-unit.

12. The multi-core flat cable for vehicle according to claim 9, wherein both of the two power wires belong to the first sub-unit.

13. The multi-core flat cable for vehicle according to claim 9, wherein the sheath is in contact with the first sub-unit at a first position and is in contact with the second sub-unit at a second position,
wherein a portion of the sheath between the first position and the second position includes a flat portion, and
wherein an insulation-coated electric wire is provided in a gap defined the first sub-unit, the second sub-unit, and the flat portion.

* * * * *